Dec. 23, 1924.  
P. PERDUE  
1,520,079  
HOE FOR CULTIVATORS AND SEED DRILLS  
Filed Aug. 24, 1922
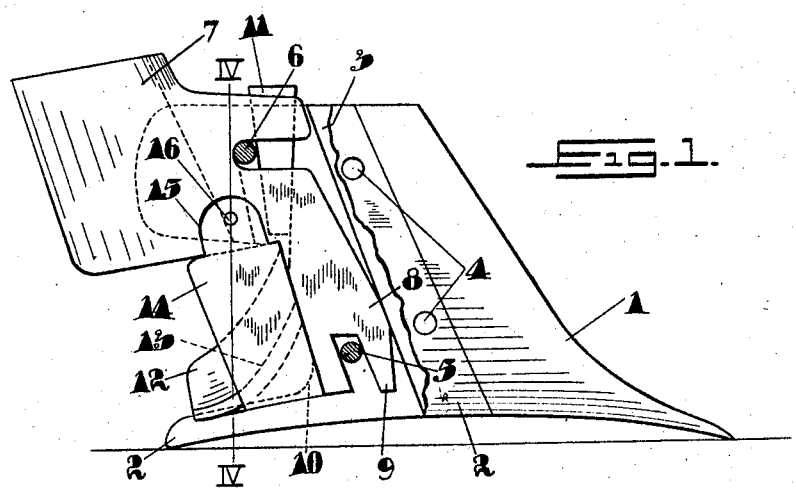
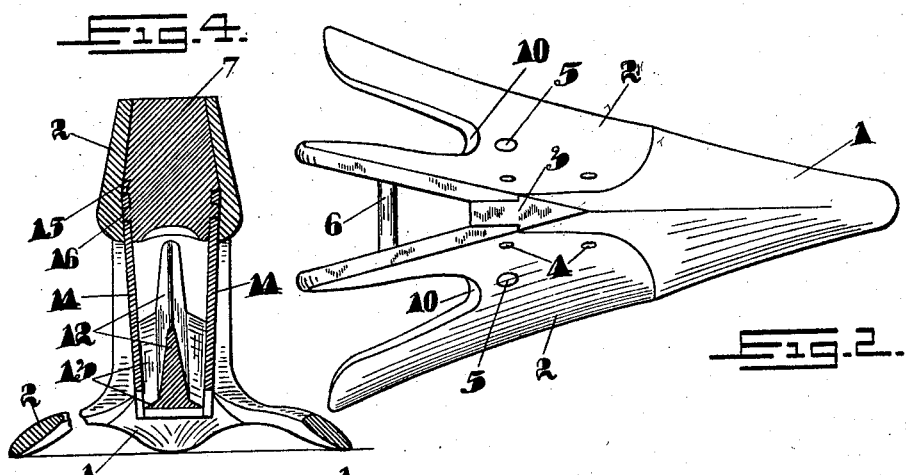
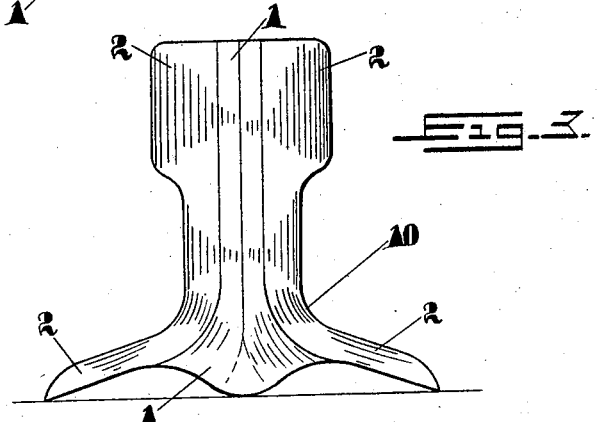
INVENTOR.  
P. Perdue.  
BY J. Edward Maybee.  
ATTY.

Patented Dec. 23, 1924.

1,520,079

UNITED STATES PATENT OFFICE.

PETER PERDUE, OF SEAFORTH, ONTARIO, CANADA.

HOE FOR CULTIVATORS AND SEED DRILLS.

Application filed August 24, 1922. Serial No. 584,222.

*To all whom it may concern:*

Be it known that I, PETER PERDUE, of Seaforth, in the county of Huron, Province of Ontario, Canada, a subject of the King of Great Britain, have invented certain new and useful Improvements in Hoes for Cultivators and Seed Drills, of which the following is a specification.

This invention relates to hoes used on cultivators and seed drills, and it is my object to devise a construction of hoe which is more easily manufactured than hoes as at present constructed, which can be attached to existing machines, which may be used on either a cultivator or seed drill, and which, when used on a seed drill, is particularly adapted to open a smooth, wide furrow, which will properly spread the seed dropping from the seed spout over the whole width of the furrow, and which will allow the earth to fall back at the proper time and spot to thoroughly cover the seed after it has been deposited by the drill.

I attain my object by means of the constructions hereinafter described and illustrated in the accompanying drawings in which—

Fig. 1 is a side elevation of my improved hoe, partly broken away to show its method of connection to the cultivator shank or seed drill;

Fig. 2 a plan view of the hoe;

Fig. 3 a front view of the same; and

Fig. 4 a section on the line IV—IV in Fig. 1.

In the drawings like numerals of reference indicate corresponding parts in the different figures.

The hoe comprises the forward cutting portion 1 and the separate cheek pieces 2, the rear part of the portion 1 being of reduced thickness to form a tongue 3. The cheek pieces are secured to this tongue by rivets 4 driven into suitable holes formed in the cheek pieces and tongue.

The cheek pieces behind the tongue are held in proper spaced relationship by means of the rivets 5 and 6. These rivets 5 and 6 are also utilized for another purpose as will hereinafter appear.

Seven is the member on which the hoe is carried, which may be either the shank of a cultivator or the seed spout of a seed drill. This part 7 is shaped to fit the space between the cheek pieces 2 and is provided with a depending portion 8 which fits tightly against the tongue 3 and has a depending tongue 9 which fits between the rivet 5 and tongue 3. The upper part of this depending portion 8 fits under the rivet 6, and a wedge member 11 is driven in front of the rivet 6 into a slot formed in this portion 8 to hold the member 7 in position.

As a hoe of the type described opens a very wide furrow, and as it is desirable that the seed from the seed spout be spread as far as possible over the whole width of the furrow, I form on the back of the depending portion 8, the spreader 12. This spreader is in the main of inverted V-shape in cross section so that seed dropping from the seed spout on to the spreader is directed sideways. Across the forward lower corner at each side of the spreader is formed a shoulder 13, so that grain travelling down the spreader is directed not only sideways, but also rearwardly.

In order that the soil may be broken up by the hoe as much as possible, the central rear portions of the cheek pieces 2 are cut away. When in use on a cultivator the furrow is opened up by the portion 1 and the soil is directed up the sides on to the cheek pieces 2. When the soil reaches the space 10 where the cheek pieces are cut away, it falls back through these spaces.

In order to prevent the soil falling back too soon when the hoe is used on a seed drill, I provide the auxiliary cheek pieces 14, which may be of any desirable size. The upper ends of these cheek pieces are received in notches 15 in the sides of the part 7 and will be held in place preferably by having lugs 16 formed in these notches, which lugs are adapted to enter holes in the auxiliary cheek pieces 14. When the hoe is in position there is no possibility of these auxiliary check pieces becoming disengaged.

After the furrow has been opened by the portion 1, the seed drops from the seed spout on to the spreader 12, by which it is scattered over the whole width of the furrow. The soil passes up the cheek pieces 2, but owing to the presence of the auxiliary cheek pieces 14 is prevented from dropping back into the furrow through the spaces 10 until the seed has been properly deposited.

By removing the rivets 4, a new portion 1 may be substituted when the old one becomes worn.

From the above description it will be seen that I have devised a construction which will satisfactorily attain the objects of my invention as set forth in the preamble of the specification, and it will be found that a hoe made in separate parts will be much more easily manufactured than a hoe made all in one piece, and also permit the manufacture of a hoe of much greater width than would otherwise be possible, thus preventing the leaving of uncultivated pieces between the hoe furrows and making sure that all weeds will be cut down.

What I claim as my invention is:

1. In a device of the character described, a hoe comprising a forward cutting portion having a pair of separate outwardly and rearwardly directed cheek pieces secured thereto, the distance between the rear portions of said cheek pieces being gradually increased from top to bottom, the central rear portions of said cheek pieces being deeply cut away to form gaps through which soil may pass, the portions of each cheek piece above the gap being directed substantially vertically and the portion below the gap at an acute angle to the horizontal.

2. In a device of the character described, a hoe having a pair of outwardly and rearwardly directed cheeks; a pair of spacing members holding the rear ends of said cheek pieces in spaced relationship; a member on which said hoe is supported; said member having a slot formed therein; a tongue on said member adapted to project between the rear of the forward cutting portion and the lowermost spacing member; and a wedge between the forward cutting portion and the uppermost spacing member and projecting into said slot.

3. In a device of the character described, a hoe having a pair of rearwardly and outwardly directed cheeks, the central rear portion of said cheeks being cut away to form gaps through which soil may pass; a member on which the hoe is supported; and a pair of auxiliary cheek pieces supported on said member and partially closing said gaps.

Signed at Toronto this 14th day of August, 1922.

PETER PERDUE.